(12) United States Patent
Wang et al.

(10) Patent No.: US 9,652,039 B2
(45) Date of Patent: May 16, 2017

(54) MANAGEMENT METHODS AND SYSTEMS FOR ITEM CHANGE

(71) Applicant: Noodoe Corporation, Taipei (TW)

(72) Inventors: John C. Wang, Taipei (TW); Yi-An Hou, Taipei (TW); Chih-Feng Hsu, Taipei (TW); Chieh Yang, Taipei (TW); Ming-San Huang, Taipei (TW)

(73) Assignee: NOODOE CORPORATION, Taipei (TW)

( * ) Notice: Subject to any disclaimer, the term of this patent is extended or adjusted under 35 U.S.C. 154(b) by 299 days.

(21) Appl. No.: 14/599,602

(22) Filed: Jan. 19, 2015

(65) Prior Publication Data

US 2015/0234466 A1    Aug. 20, 2015

(30) Foreign Application Priority Data

Feb. 17, 2014   (TW) .............................. 103105046 A

(51) Int. Cl.
*G06F 3/01*      (2006.01)
*G06F 3/0484*    (2013.01)

(52) U.S. Cl.
CPC .......... *G06F 3/016* (2013.01); *G06F 3/04842* (2013.01)

(58) Field of Classification Search
CPC ............................... G06F 3/0482; G06F 3/017
USPC ................... 715/853, 739, 828, 835, 721
See application file for complete search history.

(56) References Cited

U.S. PATENT DOCUMENTS

| | | | |
|---|---|---|---|
| 8,108,788 B2* | 1/2012 | Tornqvist | G06F 3/0482 715/721 |
| 2009/0088204 A1* | 4/2009 | Culbert | G06F 3/017 455/556.1 |
| 2010/0169097 A1 | 7/2010 | Nachman et al. | |
| 2011/0066976 A1* | 3/2011 | Hwang | G06F 3/04883 715/810 |
| 2014/0298253 A1* | 10/2014 | Jin | G06F 3/04842 715/790 |
| 2015/0193096 A1* | 7/2015 | Lee | G06F 3/0482 715/739 |
| 2015/0193129 A1* | 7/2015 | Cho | G06F 3/0482 715/739 |
| 2016/0006864 A1* | 1/2016 | Park | G06F 17/30873 715/835 |
| 2016/0196016 A1* | 7/2016 | Shim | G06F 3/0482 715/828 |

FOREIGN PATENT DOCUMENTS

EP    2631759 A2    8/2013

* cited by examiner

*Primary Examiner* — Kevin Nguyen
(74) *Attorney, Agent, or Firm* — McClure, Qualey & Rodack, LLP

(57) ABSTRACT

Management methods and systems for item change are provided. First, a plurality of items are provided. An instruction for performing a change between the items is received. When the change between the items is performed, a notification is generated to inform the performance of the corresponding change.

12 Claims, 4 Drawing Sheets

MANAGEMENT METHODS AND SYSTEMS FOR ITEM CHANGE

BACKGROUND OF THE INVENTION

Field of the Invention

The disclosure relates generally to management methods and systems for item change, and, more particularly to methods and systems that can generate related notifications when a change between items in an electronic device is performed.

Description of the Related Art

Recently, portable devices, such as smart phones, notebooks, wearable devices, or other portable devices, have become more and more technically advanced and multifunctional. For example, a portable device may have network connecting capabilities. Users can use their portable devices to connect to networks anytime and anywhere. For the convenience and newly functionalities advanced by modern technology, these devices have become necessities of life Generally, various user interfaces can be provided in a portable device for operating corresponding functions and applications in that device. Typically, a portable device can have at least one input tool, such as a physical button or a touch-sensitive screen. Users can use their fingers to input commands to the device via the physical button or the touch-sensitive screen to operate the user interfaces, and switch between items, such as applications in the user interfaces.

The technology of operating devices in a touch manner has indeed changed the human behavior of operating electronic devices, and has brought forward remarkable benefits. However, users must concentrate on watching the screen of an electronic device to know the operation status of user interfaces. In some aspects, users cannot concentrate on watching the screen. In particular for drivers, it is hard to accurately operate user interfaces, and repeated operating behaviors will result in a waste of system resources. Consequently, providing more intuitive, accurate and efficient user interfaces and related operational methods is an important topic which the industry is expected to solve. New, safer, more intuitive, accurate and efficient user interfaces are also highly sought after by most users.

BRIEF SUMMARY OF THE INVENTION

Management methods and systems item change are provided, wherein related notifications can be generated when a change between items in an electronic device is performed.

In an embodiment of a management method for item change, a plurality of items are provided in an electronic device. An instruction for performing a change between the items is received. When the change between the items is performed, a notification is generated to inform the performance of the corresponding change.

An embodiment of a management system for item change comprises a receiving unit, and a processing unit. The receiving unit receives an instruction. In response to the instruction, the processing unit performs a change between items. When the change between the items is performed, the processing unit generates a notification to inform the performance of the corresponding change.

In some embodiments, the notification comprises lights, sounds, and/or a vibration.

In some embodiments, the items comprise a first item, a second item, and a third item. The notification corresponding to the change between the first item and the second item and the notification corresponding to the change between the second item and the third item are different.

In some embodiments, the items comprise a first item, a second item, and a third item, and the notification comprises a vibration. The vibration corresponding to the change between the first item and the second item and the vibration corresponding to the change between the second item and the third item have different vibration states. In some embodiments, the vibration state comprises an amplitude, a frequency, and/or a period of vibration.

In some embodiments, the notification comprises a vibration, and the items are arranged in a specific sequence. An intensity of vibration corresponding to the change between the last two items in the specific sequence is not less than the intensity of vibration corresponding to the change between any two items in the specific sequence.

In some embodiments, at least one sensing unit detects a motion of the electronic device, and the instruction is generated according to the motion.

In some embodiments, at least one physical button, a touch-sensitive screen, and/or an optical unit of the electronic device can used to receive the instruction.

In some embodiments, the items correspond to different applications, respectively correspond to an inactivation function and an activation function of an application, and/or respectively correspond to different states of an application.

In an embodiment of a management method for item change, a plurality of items are provided in an electronic device. A motion of the electronic device is detected by at least one sensing unit, and an instruction is generated according to the motion. In response to the instruction, a change between the items is performed. When the change between the items is performed, a notification is generated to inform the performance of the corresponding change.

Management methods for item change may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Management methods and systems for item change are provided.

Figure 1:
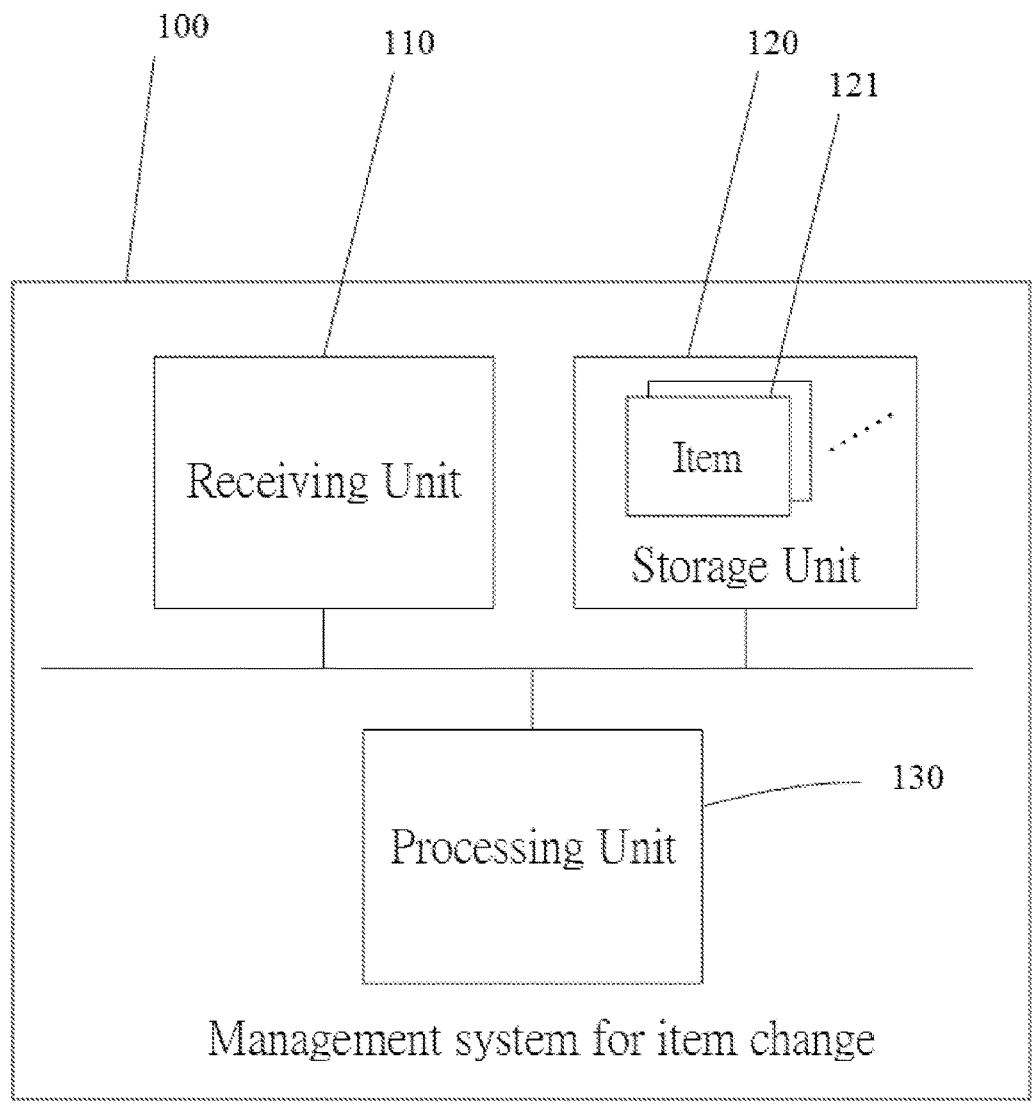
FIG. 1 is a schematic diagram illustrating an embodiment of a management system for item change of the invention.

FIG. 1 is a schematic diagram illustrating an embodiment of a management system for item change of the invention. As shown in FIG. 1, the management system for item change 100 can be used in an electronic device. In some embodiments, the electronic device may be a portable device, such as a mobile phone, a smart phone, a PDA (Personal Digital Assistant), a GPS (Global Positioning System), a notebook, a tablet computer, or a wearable device.

The management system for item change 100 comprises a receiving unit 110, a storage unit 120, and a processing unit 130. The receiving unit 110 can receive an instruction input to the electronic device. It is understood that, in some embodiments, the receiving unit 110 can be at least one physical button, a touch-sensitive screen, and/or an optical unit, such as an IR detector or an image capture unit of the electronic device. In some embodiments, the receiving unit 110 can be a sensing unit to detect a motion of the electronic device. In some embodiments, the sensing unit may be an accelerometer such as a G-sensor for generating information of velocity and displacement when the electronic device moves. In some embodiments, the sensing unit may be a Gyro sensor for generating information of angular acceleration when the electronic device moves. It is noted that, the above sensors are only examples of the present invention, and the present invention is not limited thereto. Any sensor which can detect the motion of an electronic device can be applied in the present invention. Similarly, the above receiving units are only examples of the present invention, and the present invention is not limited thereto. The storage unit 120 can store a plurality of items 121. It is noted that, the electronic device can have at least one user interface, and the items can be in the user interface. In some embodiments, the items correspond to different applications. In some embodiments, the items respectively correspond to an inactivation function and an activation function of an application. In some embodiments, the items respectively correspond to different states of an application. It is noted that, the instruction received by the receiving unit can be used to operate the electronic device to perform a change between items. Additionally, the storage unit 120 can store related data, such as data generated by the receiving unit 110, applications provided by the electronic device, and related user interfaces. The processing unit 130 can control related operations of hardware and software in the electronic device, and perform the management methods for item change of the invention, which will be discussed later. It is understood that, in some embodiments, the management system for item change 100 can further comprise a display unit (not shown in FIG. 1) for displaying related information, such as images, interfaces, and/or related data.

Figure 2:
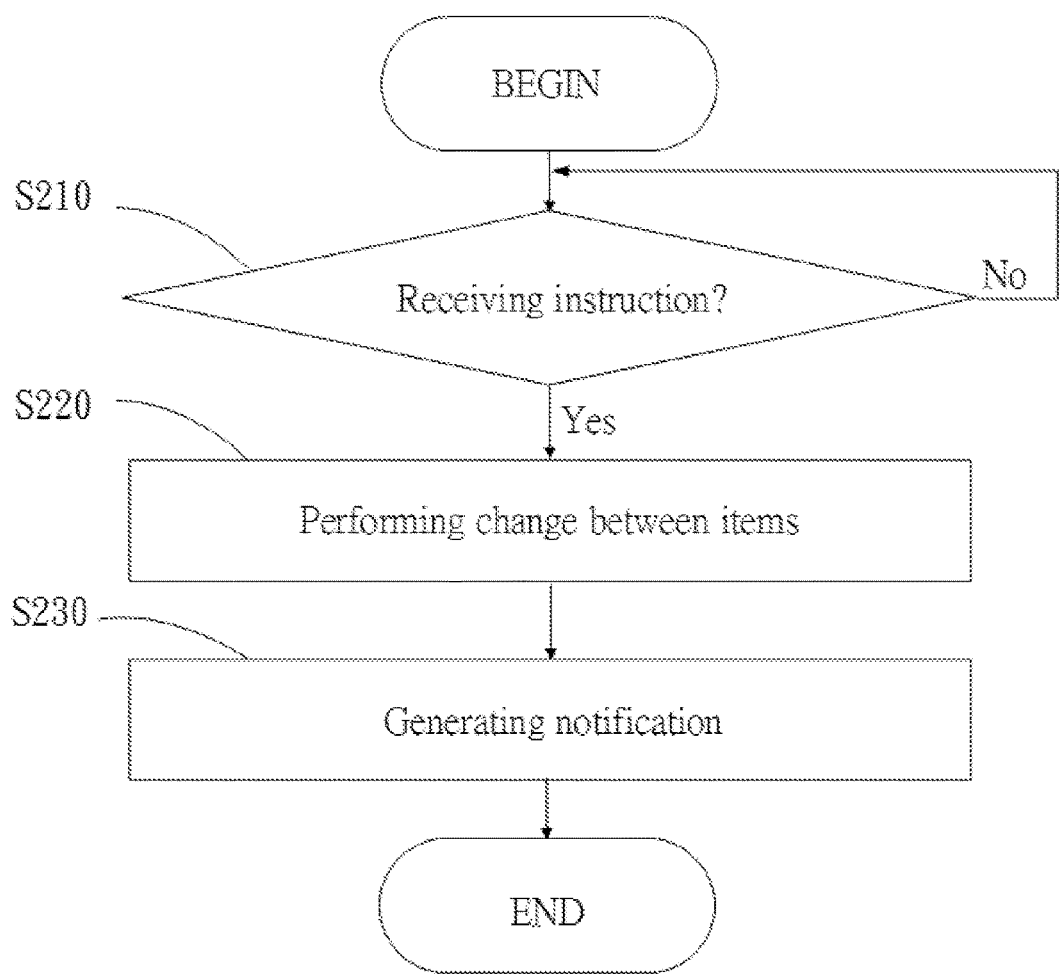
FIG. 2 is a flowchart of an embodiment of a management method for item change of the invention.

FIG. 2 is a flowchart of an embodiment of a management method for item change of the invention. The management method for item change of the invention can be used in an electronic device, such as a mobile phone, a smart phone, a PDA, a GPS, a notebook, a tablet computer, a wearable device, or other portable devices.

In step S210, it is determined whether an instruction is received. It is noted that, the electronic device can have a plurality of items. It is understood that, in some embodiments, the items correspond to different applications. In some embodiments, the items respectively correspond to an inactivation function and an activation function of an application. In some embodiments, the items respectively correspond to different states of an application. The instruction received in step S210 can be used to operate the electronic device to perform a change between items. It is understood that, in some embodiments, the electronic device can have at least one sensing unit, such as an accelerometer and/or a Gyro sensor for detecting a motion of the electronic device. The motion detected by the sensing unit can be used to generate the instruction received in step S210. That is the motion of the electronic device can generate an instruction to perform a change between items. In some embodiments, the electronic device can have at least one physical button, a touch-sensitive screen, and/or an optical unit. The instruction in step S210 can receive via the physical button, the touch-sensitive screen, and/or the optical unit. If no instruction is received (No in step S210), the procedure remains at step S210. If an instruction is received (Yes in step S210), in step S220, a change between items is performed. When the change between the items is performed, in step S230, a notification is generated to inform the performance of the corresponding change.

In some embodiments, the notification comprises lights, sounds, and/or a vibration. In some embodiments, the notifications corresponding to the changes between different items can be different. In some embodiments, the items comprise a first item, a second item, and a third item. The notification corresponding to the change between the first item and the second item and the notification corresponding to the change between the second item and the third item are different. For example, the notification corresponding to the change between the first item and the second item can be sounds, and the notification corresponding to the change between the second item and the third item can be a vibration. In some examples, the items comprise a first item, a second item, and a third item, and the notification comprises a vibration. The vibration corresponding to the change between the first item and the second item and the vibration corresponding to the change between the second item and the third item have different vibration states. In some embodiments, the vibration state comprises an amplitude, a frequency, and/or a period of vibration. Further, in some examples, the notification comprises a vibration, and the items are arranged in a specific sequence. An intensity of vibration corresponding to the change between the last two items in the specific sequence is not less than the intensity of vibration corresponding to the change between any two items in the specific sequence. For example, the intensity of vibration corresponding to the respectively change from the first item to the last item in the specific sequence will be more and more strong. It is understood that, the above notifications are only examples of the present invention, and the present invention is not limited thereto.

Figure 3:
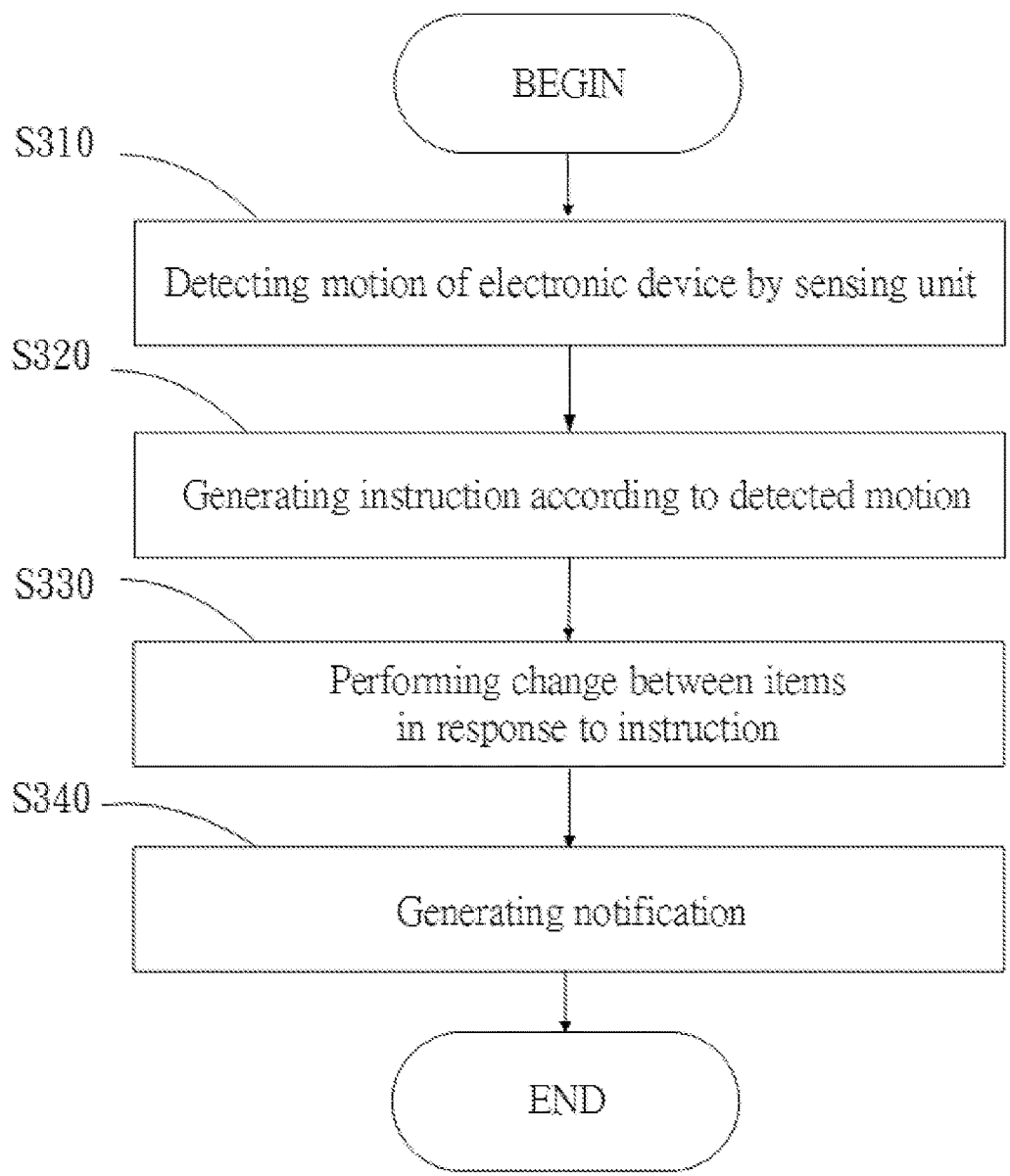
FIG. 3 is a flowchart of another embodiment of a management method for item change of the invention.

FIG. 3 is a flowchart of another embodiment of a management method for item change of the invention. The management method for item change of the invention can be used in an electronic device, such as a mobile phone, a smart phone, a PDA, a GPS, a notebook, a tablet computer, a wearable device, or other portable devices.

In step S310, at least one sensing unit detects a motion of the electronic device. It is understood that, in some embodiments, the sensor may be an accelerometer for generating information of velocity and displacement when the electronic device moves. In some embodiments, the sensor may be a Gyro sensor for generating information of angular acceleration when the electronic device moves. It is noted that, the above sensors are only examples of the present invention, and the present invention is not limited thereto. Any sensor which can detect the motion of an electronic device can be applied in the present invention. Then, in step S320, an instruction is generated according to the detected motion of the electronic device. It is noted that, the electronic device can have a plurality of items. It is understood that, in some embodiments, the items correspond to different applications. In some embodiments, the items respectively correspond to an inactivation function and an activation function of an application. In some embodiments, the items respectively correspond to different states of an application. The instruction generated in step S320 can be used to operate the electronic device to perform a change between items. That is the motion of the electronic device can generate an instruction to perform a change between items.

For example, the electronic device may be a wearable device worn on the arm of a user, and the user can twist the forearm to cause the electronic device to generate the motion to perform the change between items. It is noted that, the above electronic devices and the manners for generating motions are only examples of the present invention, and the present invention is not limited thereto. In response to the instruction, in step S330, a change between items is performed. When the change between the items is performed, in step S340, a notification is generated to inform the performance of the corresponding change. Similarly, in some embodiments, the notification comprises lights, sounds, and/or a vibration. In some embodiments, the notifications corresponding to the changes between different items can be different.

Figure 4:
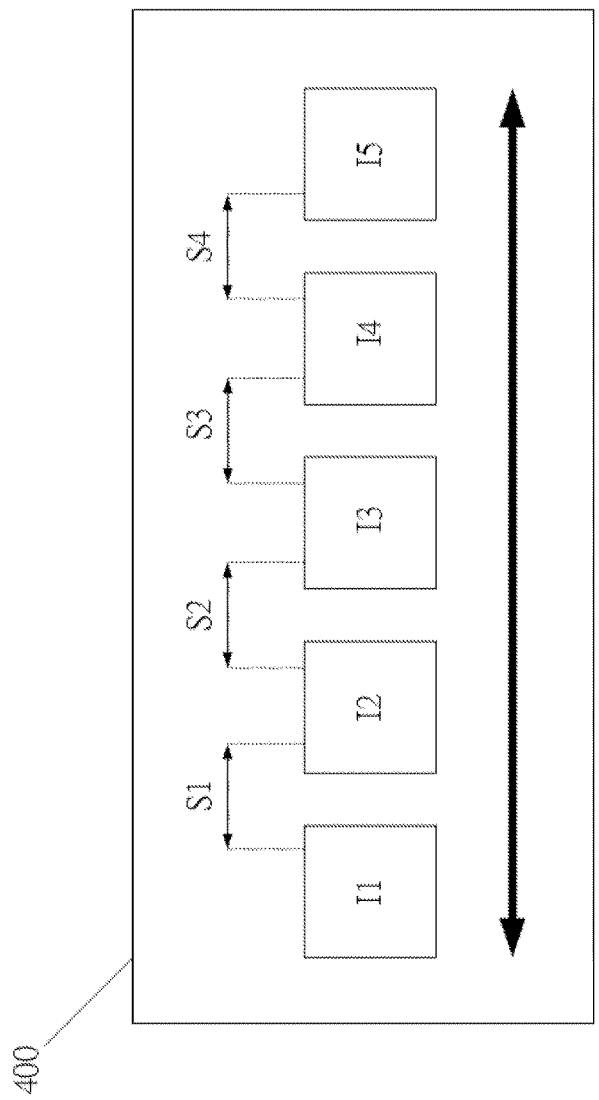
FIG. 4 is a schematic diagram illustrating an example of item change of the invention.

FIG. 4 is a schematic diagram illustrating an example of item change of the invention. In the example of FIG. 4, items I1, I2, I3, I4 and I5 are sequentially arranged in a user interface 400. Users can use any manner to instruct the electronic device to perform a change between the items, such as change S1 between items I1 and I2, change S2 between items I2 and I3, change S3 between items I3 and I4, or change S4 between items I4 and I5. As described, the notifications corresponding to the changes between different items can be different. In some cases, when item I3 is preset as the central item, the intensity of vibration (notification) corresponding to the change S3 between items I3 and I4 and the intensity of vibration (notification) corresponding to the change S2 between items I2 and I3 can be the same, the intensity of vibration (notification) corresponding to the change S4 between items I4 and I5 and the intensity of vibration (notification) corresponding to the change S1 between items I1 and I2 can be the same, and the intensity of vibration (notification) corresponding to the change S4 between items I4 and I5 is greater than the intensity of vibration (notification) corresponding to the change S3 between items I3 and I4.

Therefore, the management methods and systems for item change of the present invention can generate related notifications when a change between items is performed, thereby providing more intuitive, accurate, and efficient user interfaces and the corresponding operational methods, and fulfilling the aspiration of most users.

Management methods for item change may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A management method for item change for use in an electronic device, comprising:
   providing a plurality of items;
   receiving an instruction for performing a change between the items; and
   when the change between the items is performed, generating a notification to inform the performance of the corresponding change, wherein the notification comprises a vibration, the items are arranged in a specific sequence, and an intensity of vibration corresponding to the change between the last two items in the specific sequence is not less than the intensity of vibration corresponding to the change between any two items in the specific sequence.

2. The method of claim 1, wherein the notification comprises lights, sounds, or a vibration.

3. The method of claim 1, wherein the items comprise a first item, a second item, and a third item, and the notification corresponding to the change between the first item and the second item and the notification corresponding to the change between the second item and the third item are different.

4. The method of claim 1, wherein the items comprise a first item, a second item, and a third item, the notification comprises a vibration, and the vibration corresponding to the change between the first item and the second item and the vibration corresponding to the change between the second item and the third item have different vibration states.

5. The method of claim 1, further comprising receiving the instruction via at least one physical button, a touch-sensitive screen, or an optical unit of the electronic device.

6. A management system for item change for use in an electronic device, comprising:
   a receiving unit receiving an instruction; and
   a processing unit performing a change between items in response to the instruction, and generating a notification to inform the performance of the corresponding change when the change between the items is performed, wherein the notification comprises a vibration, the items are arranged in a specific sequence, and an intensity of vibration corresponding to the change between the last two items in the specific sequence is not less than the intensity of vibration corresponding to the change between any two items in the specific sequence.

7. The system of claim 6, wherein the notification comprises lights, sounds, or a vibration.

8. The system of claim 6, wherein the items comprise a first item, a second item, and a third item, and the notification corresponding to the change between the first item and the second item and the notification corresponding to the change between the second item and the third item are different.

9. The system of claim 6, wherein the items comprise a first item, a second item, and a third item, the notification comprises a vibration, and the vibration corresponding to the change between the first item and the second item and the vibration corresponding to the change between the second item and the third item have different vibration states.

10. The system of claim 6, wherein the receiving unit comprises at least one physical button, a touch-sensitive screen, or an optical unit for receiving the instruction.

11. A management method for item change for use in an electronic device, comprising:

providing a plurality of items;
detecting a motion of the electronic device by at least one sensing unit, and generating an instruction according to the motion;
in response to the instruction, performing a change between the items; and
when the change between the items is performed, generating a notification to inform the performance of the corresponding change, wherein the notification comprises a vibration, the items are arranged in a specific sequence, and an intensity of vibration corresponding to the change between the last two items in the specific sequence is not less than the intensity of vibration corresponding to the change between any two items in the specific sequence.

12. A non-transitory machine-readable storage medium comprising a computer program, which, when executed, causes a device to perform a management method for item change for use in an electronic device, wherein the method comprises:

providing a plurality of items;
receiving an instruction for performing a change between the items; and
when the change between the items is performed, generating a notification to inform the performance of the corresponding change, wherein the notification comprises a vibration, the items are arranged in a specific sequence, and an intensity of vibration corresponding to the change between the last two items in the specific sequence is not less than the intensity of vibration corresponding to the change between any two items in the specific sequence.

\* \* \* \* \*